US008243082B1

(12) United States Patent
Wyatt et al.

(10) Patent No.: US 8,243,082 B1
(45) Date of Patent: Aug. 14, 2012

(54) METHOD AND SYSTEM FOR ACCESSING DISPLAY CONFIGURATION INFORMATION IN A MULTI-GPU SYSTEM VIA AN EMBEDDED CONTROLLER

(75) Inventors: David Wyatt, San Jose, CA (US); Ludger Mimberg, San Jose, CA (US)

(73) Assignee: NVIDIA Corporation, Santa Clara, CA (US)

( * ) Notice: Subject to any disclaimer, the term of this patent is extended or adjusted under 35 U.S.C. 154(b) by 818 days.

(21) Appl. No.: 12/104,393

(22) Filed: Apr. 16, 2008

(51) Int. Cl.
*G06F 15/16* (2006.01)
(52) U.S. Cl. .................................... 345/502
(58) Field of Classification Search ............. 345/502
See application file for complete search history.

(56) References Cited

U.S. PATENT DOCUMENTS

| 6,903,706 | B1 * | 6/2005 | Trottier et al. | 345/1.1 |
|---|---|---|---|---|
| 7,123,248 | B1 * | 10/2006 | Lafleur | 345/204 |
| 2005/0083247 | A1 * | 4/2005 | Juenger | 345/2.2 |
| 2005/0285865 | A1 | 12/2005 | Diamond | |
| 2007/0046697 | A1 | 3/2007 | Hussain | |
| 2007/0283175 | A1 * | 12/2007 | Marinkovic et al. | 713/320 |
| 2008/0034238 | A1 | 2/2008 | Hendry et al. | |
| 2008/0084359 | A1 * | 4/2008 | Giannuzzi et al. | 345/1.1 |

OTHER PUBLICATIONS

I2C-Bus Specification, Version 2.1, Jan. 2000, published by Philips Semiconductors, pp. 1-46.*
Office Action in U.S. Appl. No. 12/104,398, mailed Apr. 15, 2011.
Office Action in U.S. Appl. No. 12/104,400, mailed Apr. 15, 2011.
Final Office Action, U.S. Appl. No. 12/104,400 dated Sep. 13, 2011.

* cited by examiner

*Primary Examiner* — Edward Martello
(74) *Attorney, Agent, or Firm* — Patterson & Sheridan, LLP

(57) ABSTRACT

One embodiment of the present invention sets forth a method for accessing display configuration information in a multi-GPU system, which includes the steps directing the display configuration information of a display device, coupled to a discrete GPU (dGPU), to a controller capable of accessing a display data bus, if the dGPU is unavailable, wherein the controller is capable of making the display configuration information available via a system interface, and validating the display configuration information prior to availing the dGPU or the display device as an option to be selected.

26 Claims, 5 Drawing Sheets

METHOD AND SYSTEM FOR ACCESSING DISPLAY CONFIGURATION INFORMATION IN A MULTI-GPU SYSTEM VIA AN EMBEDDED CONTROLLER

BACKGROUND OF THE INVENTION

1. Field of the Invention

Embodiments of the present invention relate generally to multi-GPU systems and more specifically to a method and system for sideband access to display configuration information in a multi-GPU system via a controller, such as an embedded controller, an I2C controller, Aux Bus controller or other device capable of reading display configuration.

2. Description of the Related Art

Unless otherwise indicated herein, the approaches described in this section are not prior art to the claims in this application and are not admitted to be prior art by inclusion in this section.

To satisfy users' continued demands for graphics applications that offer rich visual effects and interactive features, various multi-graphics-processing-unit (multi-GPU) solutions have been proposed to handle the computationally-intensive operations that are needed in such graphics applications. One solution is to supplement the integrated graphics subsystem of a main computing system with an enhanced graphics subsystem. So, the main computing system can make use of the enhanced graphics subsystem to perform all rendering or assist in accelerating rendering and even drive the processed data in the frame buffer of the enhanced graphics subsystem to a display device attached to the enhanced graphics subsystem. Such a display device is herein referred to as an "add-on display device" and is often the preferred display device for the multi-GPU system, because it supports different technologies that address some of the shortcomings in the older analog display devices. Also, the GPU in the integrated graphics subsystem is herein referred to as the motherboard GPU (mGPU), and the GPU in the enhanced graphics subsystem is referred to as the discrete GPU (dGPU).

However, there currently lacks a mechanism to seamlessly transition between the integrated graphics subsystem and the enhanced graphics subsystem. In particular, in a conventional multi-GPU solution, switching between these two subsystems requires a cumbersome process of rebooting and also re-enumerating the various display devices that are attached to the two graphics subsystems. Furthermore, the dGPU in the enhanced graphics subsystem is sometimes powered-down in the conventional multi-GPU solution to reduce power consumption. During this power-down period in which the dGPU is unavailable, the add-on display device also becomes inaccessible. In other words, the current multi-GPU solution is unable to detect hot-plug events (e.g., attachment or detachment of the add-on display device) or receive any specification data associated with the add-on display device via the Display Data Channel, an Auxiliary Channel bus or other Display Configuration bus (collectively, DDC/AUX) while the dGPU is turned-off, further complicating the process of switching between the two graphics subsystems.

As the foregoing illustrates, what is needed is an improved way of accessing the add-on display device without significantly modifying the software stack to be executed on a multi-GPU system to enable the seamless transitions between the various graphics subsystems in such a system and address at least the problems set forth above.

SUMMARY OF THE INVENTION

A method and system for accessing display configuration information in a multi-GPU system via a separate device are disclosed. Specifically, one embodiment of the present invention sets forth a method, which includes the steps directing the display configuration information of a display device, coupled to a discrete GPU (dGPU), to a controller capable of accessing a display data bus, if the dGPU is unavailable, wherein the controller is capable of making the display configuration information available via a system interface, and validating the display configuration information prior to availing the dGPU or display device as an option to be selected.

In another embodiment a separate I2C Controller either stand-alone or integrated into another system device is capable of reading display configuration information and providing this through system interface to the available GPU for validating the display.

At least one advantage of the present invention disclosed herein is to avoid significantly modifying the software stack operating on a multi-GPU system while still allowing accesses to a display device that is owned by a dGPU, even when the dGPU is powered-down.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
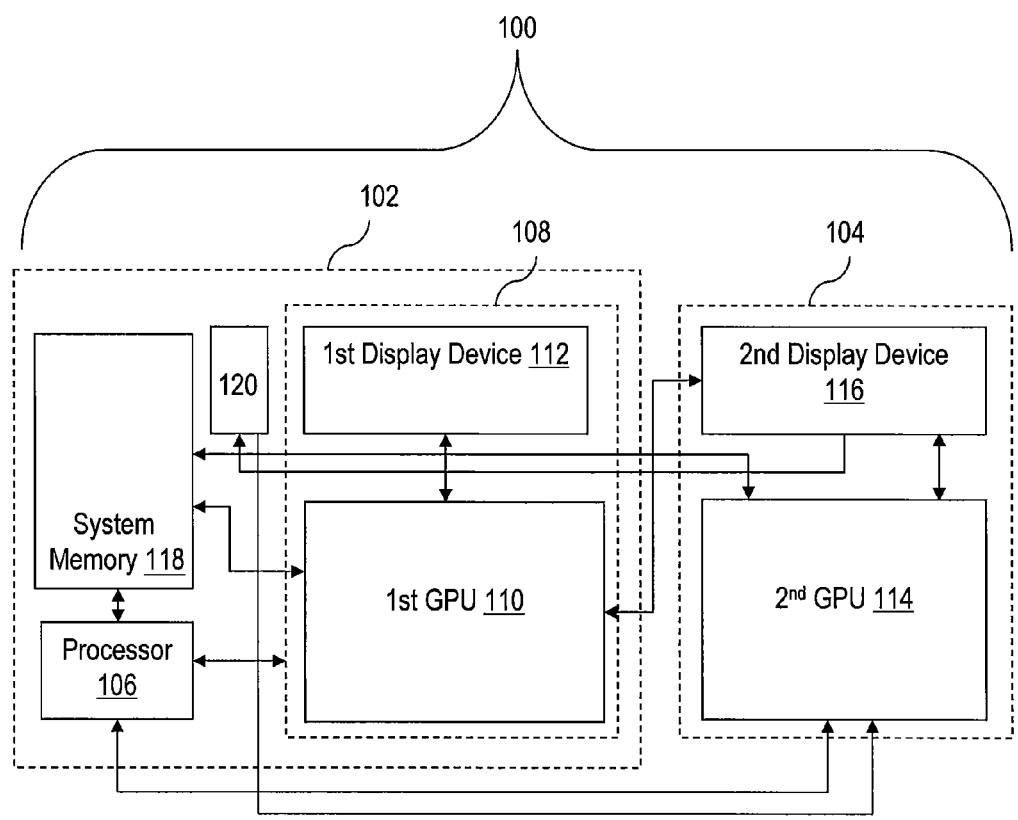
FIG. 1 is a simplified block diagram illustrating some components in a multi-GPU system that enables a seamless access to a display device attached to a discrete GPU, according to one embodiment of the present invention.

FIG. 1 is a simplified block diagram illustrating some components in a multi-GPU system 100 that enables a seamless access to a display device attached to a discrete GPU (dGPU), according to one embodiment of the present invention. Here, the dGPU corresponds to a second GPU 114, and a first GPU 110 is referred to as a motherboard GPU (mGPU). It is worth noting that by gaining access to the second display device 116 via a controller capable of accessing the display data bus 120, even if the second GPU 114 is unavailable, the multi-GPU system 100 is then able to support seamless switching (e.g., via hot-key switching or some other user interfaces) among the various display devices that are directly or indirectly coupled to it. More precisely, irrespective of the availability of the second GPU 114, the multi-GPU system 100 is still configured to enumerate and validate the capabilities of a display device owned by the second GPU 114, such as the illustrated second display device 116, prior to making such a display device available to be selected.

The multi-GPU system 100 includes a host computer 102 and a second graphics subsystem 104 (also referred to as an enhanced graphics system). The host computer 102 includes a processor 106 and a first graphics subsystem 108 (also referred to as the integrated graphics system). The first graphics subsystem 108 further includes a first GPU 110 and a first display device 112. The second graphics system 104 includes a second GPU 114 and a second display device 116. The host computer 102 also includes the controller 120 capable of accessing the display data bus mentioned above, either as a standalone I2C controller, or a system embedded controller, which is configured to receive hot-plug detection signals and configuration information associated with the second display device 116 via its general purpose input/output (GPIO) port. Subsequent paragraphs further detail how the controller 120 capable of accessing the display data bus is configured to interact with the rest of the multi-GPU system 100 to access the second display device 116, even if the second GPU 114 is unavailable.

The host computer 102 further includes a system memory 118, which stores programming instructions and data for the processor 106 to execute and operate on. In one implementation, these programming instructions are for a hybrid driver, a first graphics driver for the first GPU 110, and a second graphics driver for the second GPU 114. These software components are further detailed in subsequent paragraphs. In other implementations, the processor 106, the first GPU 110, a chipset (not shown), or any combination thereof, may be integrated into a single processing unit. Further, the functionality of the first GPU 110 may be included in the chipset or in some other type of special purpose processing unit or co-processor. In such embodiments, the programming instructions may reside in memory systems other than the system memory 118 and may be executed by processing units other than the processor 106.

In one configuration, the host computer 102 is a mobile device, such as a notebook computer, and is configured with the first graphics subsystem 108 and the mGPU 110. The enhanced graphics subsystem 104 is a docking system with the dGPU 114. In addition, the first display device 112 corresponds to the internal display panel of the notebook computer, while the second display device 116 is connected to the docking system.

In another configuration, the host computer 102 is a desktop system and is still configured with the first graphics subsystem 108 and the mGPU 110. The enhanced graphics subsystem 104 is an add-on system with the dGPU 114. Here, the first display device 112 corresponds to the display panel that is directly supported by the desktop system, while the second display device 116 corresponds to an external display device directly supported by the add-on system. It should be apparent to a person with ordinary skills in the art to recognize that the aforementioned multi-GPU systems can be implemented in many other configurations without exceeding the scope of the claimed invention.

Figure 2:
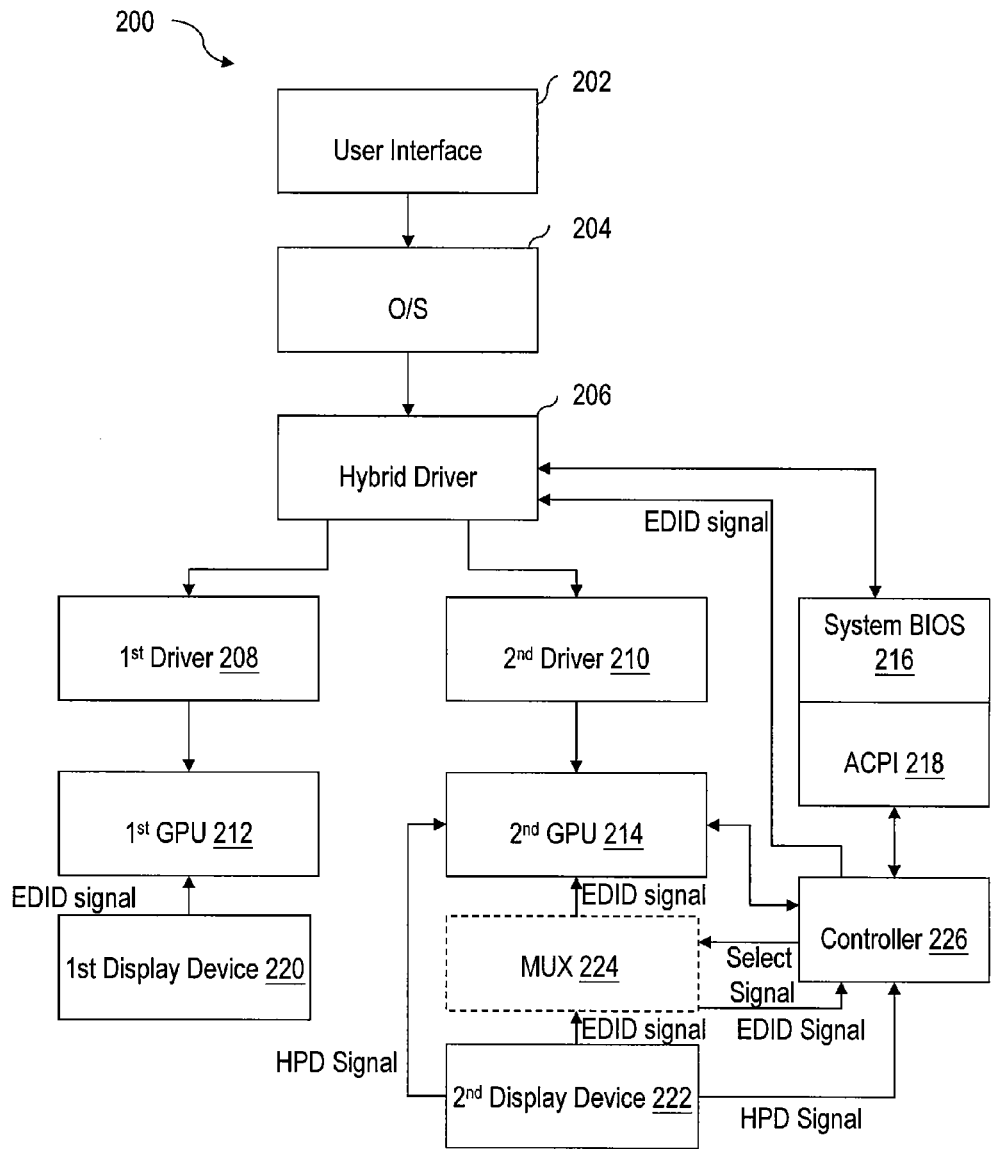
FIG. 2 is a software stack to be executed on a host computer of a multi-GPU system to provide seamless access to a display device attached to a dGPU, even if the dGPU is unavailable, via a controller capable of accessing the display data bus, according to one embodiment of the present invention.

FIG. 2 is a software stack 200 to be executed on the host computer 102 to provide seamless access to the second display device 116 attached to the second GPU 114, even if the second GPU 114 is unavailable, via the controller 120 capable of accessing the display data bus, according to one embodiment of the present invention. The software stack 200 includes a user interface (UI) 202, an operating system (OS) 204, and a hybrid driver 206. The software stack 200 includes a user interface (UI) 202, an operating system (OS) 204, and a hybrid driver 206. The UI 202 operates on top of the OS 204, which here refers to the OS for the host computer 102 of FIG. 1. The software stack 200 further includes a first driver 208 and a second driver 210 for communicating with a first GPU 212 and a second GPU 214, respectively. The first GPU 212 may correspond to the first GPU 110 of FIG. 1, and the second GPU 214 may correspond to the second GPU 114. The hybrid driver 206 mainly wraps these two drivers so that they appear as a single driver to the OS 204. Moreover, the software stack 200 also includes a system BIOS 216 and an Advanced Configuration and Power Interface (ACPI) driver 218. The ACPI driver 218 obtains power management state information and maintains a list of all enumerated display devices that are supported by the multi-GPU system 100. The ACPI driver 218 interacts with the hybrid driver 206 and also a controller 226 capable of accessing the display data bus, which may correspond to the controller 120 capable of accessing the display data bus of FIG. 1. The first GPU 212 is further connected to a first display device 220 (may correspond to the first display device 112) while the second GPU 214 is coupled to a second display device 222 (may correspond to the second display device 116) optionally through a demultiplexer (DEMUX) 224.

Before discussing the operations of the software stack 200, it is worthwhile to first explain extended display identification data (EDID) and hot-plug detection (HPD) signals. EDID is a at least 128-byte data containing information such as manufacturer name, product type, phosphor or filter type, timings supported by the display device, display size, luminance data, and pixel mapping data. Generally, the EDID signal is stored in the display device and transmitted through an I-squared-C (I2C) data bus. The combination of the I2C data bus and the EDID signal itself is referred to as display data channel (DDC) or auxiliary bus (AUX). In typical operations, the first GPU 212 is configured to receive the EDID signal of the first display device 220 while the second GPU 214 is configured to receive the EDID signal from the second display device 222. In one implementation, the first and second CPUs 212 and 214 receive the EDID signals at their respective GPIO ports. The received EDID signals are further transmitted through the layers of drivers to the OS 204, which then validates the display capabilities of the first and the second display devices 220 and 222 before possibly availing the display devices to be selected via the UI 202.

A HPD signal is generated when its corresponding plug-and-play device is added, changed, or removed. However, because the HPD signal is generally unreliable, this signal is sometimes deliberately suppressed. In one embodiment of the present invention, the EDID signal of a display device, rather than its associated HPD signal, is relied upon to retrieve the aforementioned display device configuration information and to verify the presence of the display device. As shown in FIG. 2, the controller 226 capable of accessing the display data bus is configured to receive both the HPD signal and the EDID signal associated with the second display device 222 via its GPIO port.

With the second GPU 214 powered off, the EDID signal of the second display device 222 no longer could be interfacing with the users unless it could be fetched in another way. Embodiments of having the first GPU 212 receive the EDID signal of the second display device 222 have been disclosed in another application having the same inventor as the present one. Assume the first GPU 212 is not going to fetch the EDID signal of the second display device 222, according to the present invention the controller 226 capable of accessing the display data bus will be responsible for receiving the EDID signal of the second display device 222.

Figure 3A:
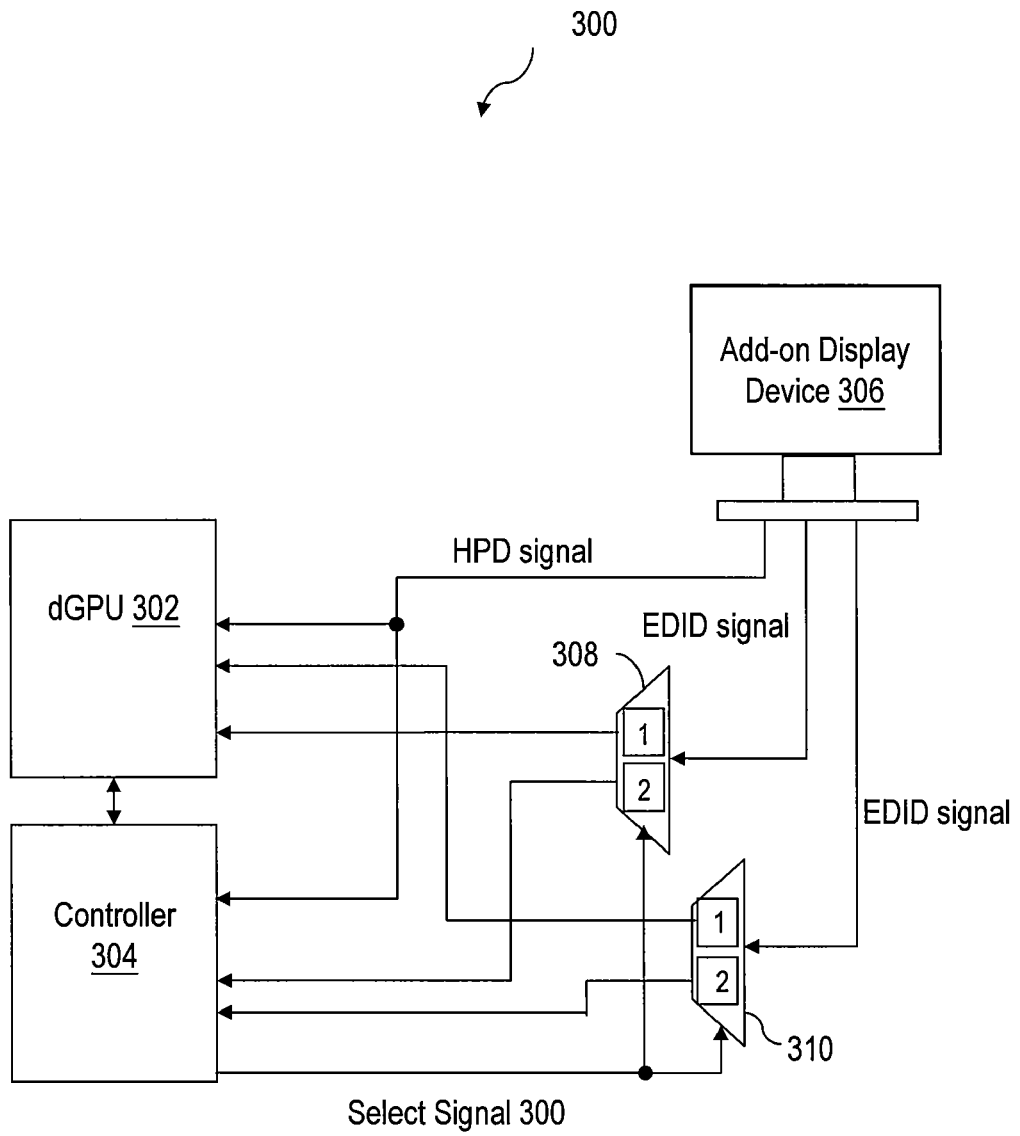
FIG. 3A is a simplified block diagram illustrating a part of a computer system configured to access an add-on display device via a controller capable of accessing the display data bus, according to one embodiment of the present invention.

FIG. 3A is a simplified block diagram illustrating a part of a computer system 300 configured to access an add-on display device 306 via a controller 304 capable of accessing the display data bus, according to one embodiment of the present invention. The computer system 300 also includes a dGPU 302 and demultiplexers 308 and 310. The dGPU 302, the controller 304 capable of accessing the display data bus, and the add-on display device 306 may correspond to the second GPU 214, the controller 336 capable of accessing the display data bus, and the second display device 306 of FIG. 2, respectively. The two demultiplexers shown in FIG. 3A may correspond to the DEMUX 224 of FIG. 2 and mainly responsible for steering the data on the DDC/AUX, such as the EDID signal of the add-on display device 306, to either the dGPU 302 or the controller 304 capable of accessing the display data bus.

To continue having access to the add-on display device 306 even if the dGPU 302 is unavailable, the ACPI driver 218 in the software stack 200 as shown in FIG. 2 causes the controller 304 capable of accessing the display data bus to assert a select signal 300 to steer the add-on display device 306 to the controller 304 capable of accessing the display data bus. Specifically, the select signal 300 is asserted to select the output 2 of the demultiplexer 308 and the demultiplexer 310, if the dGPU 302 is unavailable. On the other hand, if the dGPU 302 is powered back up, then the select signal 300 is asserted to instead select the output/of the demultiplexer 308 and the demultiplexer 310. As such, the EDID signals of the add-on display device 306 can still be fetched by the controller 304 capable of accessing the display data bus, even though the dGPU 302 is powered down. Here, the HPD signal connected to both the dGPU 302 and the controller 304 capable of accessing the display data bus remains unaffected by the assertion of the select signal 300.

Figure 3B:
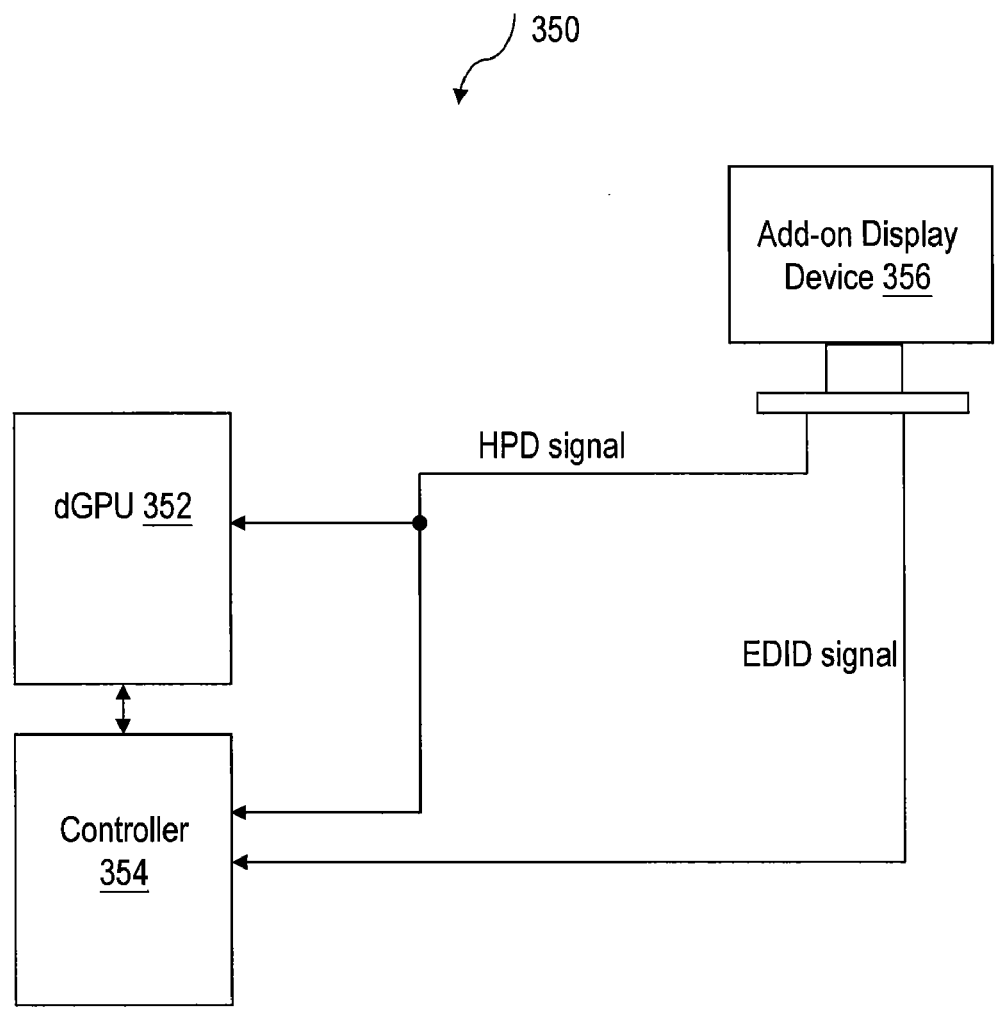
FIG. 3B is a simplified block diagram illustrating a part of another computer system configured to access an add-on display device via a controller capable of accessing the display data bus, according to another embodiment of the present invention.

FIG. 3B is a simplified block diagram illustrating a part of a computer system 350 configured to access an add-on display device 356 via a controller 354 capable of accessing the display data bus, according to another embodiment of the present invention. Unlike the computer system 300 shown in FIG. 3A, the computer system 350 does not include any demultiplexers. All the data on the DDC/AUX, such as the EDID signal, associated with the add-on display device 356 is directly fed into the controller 354 capable of accessing the display data bus. In addition, the HPD signal associated with the add-on display device 356 is still delivered to both a dGPU 352 and the controller 354 capable of accessing the display data bus. In other words, the computer system 350 relies on the controller 354 capable of accessing the display data bus to fetch the EDID signal of the add-on display device 356, regardless of the availability of the dGPU 352. It should be noted that in both the computer system 300 and the computer system 350, once the dGPU is powered back on and is available, in one implementation, the dGPU resumes the responsibilities of enumerating, validating, and driving the add-on display device.

Figure 4:
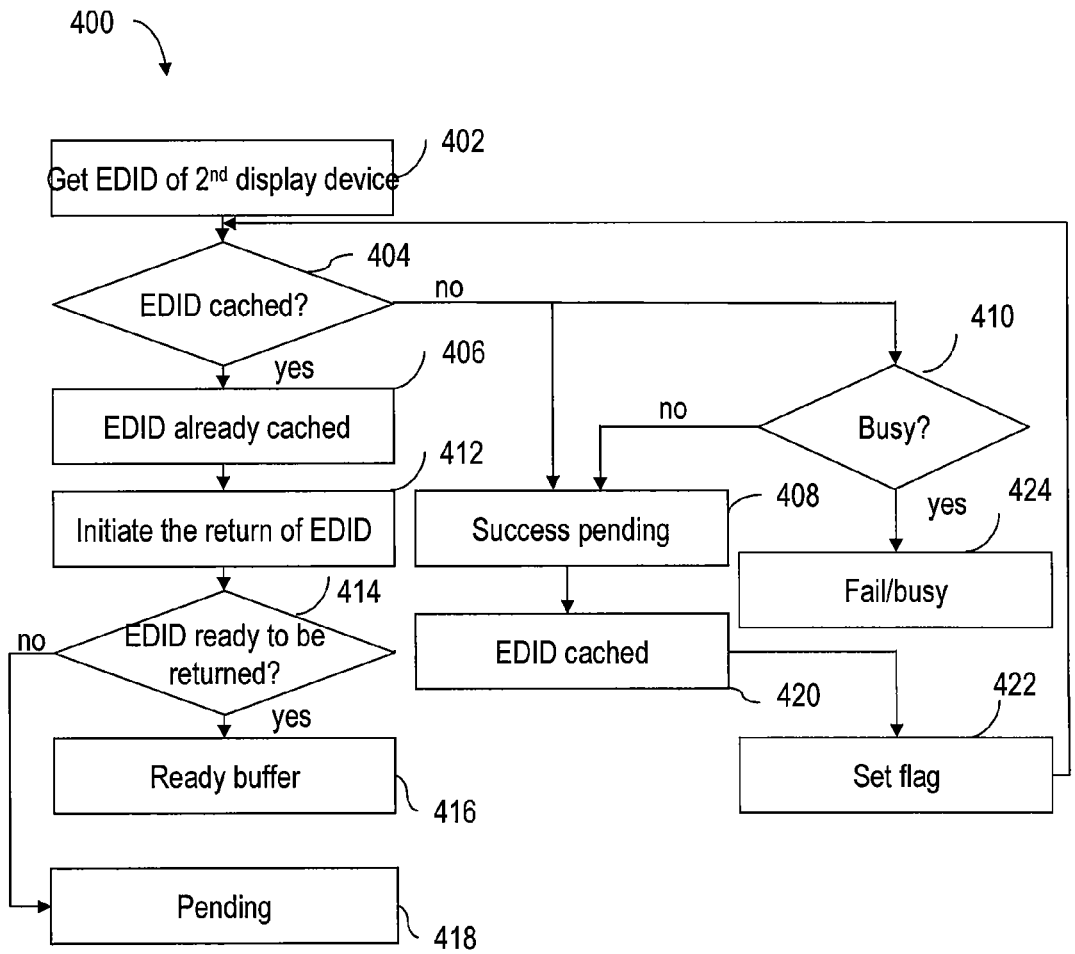
FIG. 4 is a flow chart illustrating a method of configuring the controller capable of accessing the display data bus to handle the EDID signal from a display device owned by a dGPU, according to one embodiment of the present invention.

In conjunction with the software stack 200 of FIG. 2, FIG. 4 is a flow chart illustrating a method 400 of configuring the controller 226 capable of accessing the display data bus to handle the EDID signal from the second display device 222, according to one embodiment of the present invention. Suppose a user interested to select or view the settings of the second display device 222. The UI 202 queries the OS 204 for the configuration information, such as the EDID signal, of the second display device 222. The OS 204 communicates with the hybrid driver 206, which then proceeds to fetch the EDID signal of the second display device 222 in step 402. The hybrid driver 206, through the system BIOS 216 and ACPI driver 218, manages the controller 226 capable of accessing the display data bus. The controller 226 capable of accessing the display data bus is configured to fetch and cache the EDID signal of the second display device 222. The hybrid driver 206 checks whether the EDID signal is cached in step 404. If the EDID signal is confirmed cached in step 406, then in step 408 the controller 226 capable of accessing the display data bus initiates the return of the fetched EDID signal to the hybrid driver 206. On the other hand, if the EDID signal is not cached as determined in step 404, then depending on the availability of the controller 226 capable of accessing the display data bus, the EDID signal is cached at a later time by following steps 408, 410, 420, and 422. In step 414, the hybrid driver 206 checks if EDID signal is ready to be returned by the controller 226 capable of accessing the display data bus. If yes, the EDID signal is stored into a "ready buffer" in step 416 to be returned; otherwise, the return of the EDID signal remains pending in step 418. After the EDID signal is cached in step 420, a flag indicative of the caching of the EDID signal is set in step 422. This flag is checked in step 404 to determine if the EDID signal is cached.

One embodiment of the present invention employs a controller capable of accessing the display data bus to help fetch the configuration information of the display device, even if the dGPU that owns the display device is powered off. As a result, seamless switching among of the various display devices supported in a multi-GPU system is enabled. Once the dGPU owning the display device becomes available again, the handling of this display device can optionally be handed back to the dGPU.

The above description illustrates various embodiments of the present invention along with examples of how aspects of the present invention may be implemented. One embodiment of the present invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, ROM chips, or any type of solid-state non-volatile semiconductor memory) on which information is permanently stored; and (ii) writable storage media (e.g., floppy disks within a diskette drive, CD-RW disks, DVD-RW disks, flash memory, hard-disk drive, or any type of solid-state random-access semiconductor memory) on which alterable information is stored. The above examples, embodiments, instruction semantics, and drawings should not be deemed to be the only embodiments, and are presented to illustrate the flexibility and advantages of the present invention as defined by the following claims.

We claim:
1. A method for accessing display configuration information in a multi-graphics-processing-unit (multi-GPU) system, the method comprises:
 determining that a discrete GPU (dGPU) that is coupled to a display device is powered off;
 receiving a request for the display configuration information of the display device from a hybrid driver;

fetching, by a controller, the display configuration information from the display device, wherein the controller is capable of making the display configuration information available via a system interface;

storing, by the controller, the display configuration information in a ready buffer; and validating the display configuration information prior to availing the display device as an option to be selected.

2. The method of claim 1, further comprising coupling a demultiplexer between the display device and both of the controller and the dGPU, wherein the demultiplexer is configured to output the display configuration information output by the display device to one of the controller and the dGPU.

3. The method of claim 2, further comprising asserting a select signal input to the demultiplexer to steer the display configuration information to the controller.

4. The method of claim 3, further comprising inspecting power management state information and a list of already enumerated display devices before asserting the select signal.

5. The method of claim 1, further comprising caching the display configuration information before validating the display configuration information.

6. The method of claim 1, wherein the validating step further comprises using the display configuration information to verify the presence of the display device prior to availing the display device as an option to be selected.

7. The method of claim 1, further comprising:
determining that the dGPU is powered on; and
directing the display configuration information back to the dGPU after the dGPU becomes available.

8. The method of claim 1, further comprising abstracting the handling of a first driver responsible a motherboard GPU (mGPU) and a second driver responsible for the dGPU so that the first driver and the second driver appear as a single driver to an operating system for the multi-GPU system.

9. The method of claim 1, wherein the display configuration information refers to the extended display identification data of the display device.

10. The method of claim 1, wherein the display configuration information comprises hot-plug detection data.

11. The method of claim 1, further comprising:
determining that the display configuration information is not cached in the controller;
caching the display configuration information in the controller; and
setting a flag indicating that the display configuration information is cached.

12. A multi-graphics-processing-unit (multi-GPU) system configured to access display configuration information of a display device, the multi-GPU system comprises:
a host computer with system memory, a processor configured to validate the display configuration information prior to availing the display device as an option to be selected, a controller capable of making the display configuration information available via a system interface, and a first graphics subsystem having a first GPU; and
a second graphics subsystem having a second GPU, coupled to the display device, wherein the processor is configured to execute a software stack, wherein the software stack includes a hybrid driver that is configured to:
determine that the second GPU is powered off;
receive a request for the display configuration information of the display device; and
configure the controller to fetch the display configuration information of the display device to the controller, wherein the controller is configured to store the display configuration information in a ready buffer.

13. The multi-GPU system of claim 12, wherein the multi-GPU system further comprises a demultiplexer coupled between the display device and both of the controller and the second GPU, wherein the demultiplexer is configured to output the display configuration information output by the display device to one of the controller and the second GPU.

14. The multi-GPU system of claim 13, wherein the controller is configured to assert a select signal input to the demultiplexer to steer the display configuration information to the controller.

15. The multi-GPU system of claim 12, wherein the processor is further configured to cache the display configuration information before validating the display configuration information.

16. The multi-GPU system of claim 12, wherein the processor is further configured to inspect power management state information and a list of already enumerated display devices before asserting the select signal.

17. The multi-GPU system of claim 12, wherein the processor is further configured to use the configuration information to verify the presence of the display device prior to availing display device as an option to be selected.

18. The multi-GPU system of claim 12, wherein the processor is further configured to direct the display configuration information back to the second GPU after determining that the second GPU is powered on.

19. The multi-GPU system of claim 12, wherein the single hybrid driver is further configured to abstract a first driver responsible the first GPU and a second driver responsible for the second GPU so that the first driver and the second driver appear as a single driver to an operating system for the multi-GPU.

20. The multi-GPU system of claim 12, wherein the configuration information refers to the extended display identification data of the display device.

21. The multi-GPU system of claim 12, wherein the display configuration information comprises hot-plug detection data.

22. The multi-GPU system of claim 12, wherein the controller is further configured to:
determine that the display configuration information is not cached in the controller;
cache the display configuration information in the controller; and
set a flag indicating that the display configuration information is cached.

23. A non-transitory computer-readable medium containing a sequence of instructions for a software stack, which when executed by a processor in a multi-graphics-processing-unit (multi-GPU) system, causes the processor to:
determine that a discrete GPU (dGPU) that is coupled to a display device is powered off;
fetch, by a controller, the display configuration information from the display device, wherein the controller is capable of making the display configuration information available via a system interface;
receive a request for the display configuration information of the display device from a hybrid driver;
store, by the controller, the display configuration information in a ready buffer; and
validate the display configuration information prior to availing or the display device as an option to be selected.

24. The non-transitory computer-readable medium of claim 23, further containing a sequence of instructions for the software stack, which when executed by the processor, causes the processor to further inspect power management state information and a list of already enumerated display devices before asserting a select signal to cause the display configuration information to be directed to the controller.

25. The non-transitory computer-readable medium of claim 23, wherein the display configuration information comprises hot-plug detection data.

26. The non-transitory computer-readable medium of claim 23, further comprising:

determining that the display configuration information is not cached in the controller;

caching the display configuration information in the controller; and setting a flag indicating that the display configuration information is cached.

* * * * *